(12) United States Patent
Johnson

(10) Patent No.: US 6,324,718 B1
(45) Date of Patent: Dec. 4, 2001

(54) SIDE MOUNTED RETROFIT WIPER ASSEMBLY

(76) Inventor: Subernia Y. Johnson, 1036 W. 12th St., Lakeland, FL (US) 33805-3424

(*) Notice: Subject to any disclaimer, the term of this patent is extended or adjusted under 35 U.S.C. 154(b) by 0 days.

(21) Appl. No.: 09/848,136

(22) Filed: May 3, 2001

Related U.S. Application Data

(63) Continuation-in-part of application No. 09/250,121, filed on Feb. 16, 1999, now abandoned.

(51) Int. Cl.$^7$ ........................................................ B60S 1/56
(52) U.S. Cl. ............................................. 15/250.003; 359/871
(58) Field of Search ........................ 15/250.003, 250.002, 15/250.23, 250.3; 359/871, 872, 874, 507

(56) References Cited

U.S. PATENT DOCUMENTS

| | | | |
|---|---|---|---|
| 3,968,537 | * 7/1976 | Wagenhofer | 15/250.003 |
| 4,466,712 | * 8/1984 | Vitaloni | 15/250.003 |
| 4,763,381 | * 8/1988 | Williams | 15/250.003 |
| 5,592,715 | * 1/1997 | Yoshida et al. | 15/250.003 |
| 6,058,553 | * 5/2000 | Tsuyama et al. | 15/250.003 |

FOREIGN PATENT DOCUMENTS

| | | | |
|---|---|---|---|
| 42352 | * 4/1991 | (AU) | 15/250.003 |
| 2617781 | * 1/1989 | (FR) | 15/250.003 |
| 58537 | * 4/1982 | (JP) | 15/250.003 |

\* cited by examiner

*Primary Examiner*—Gary K. Graham
(74) *Attorney, Agent, or Firm*—Pendorf & Cutliff

(57) ABSTRACT

A side rear-view mirror retrofit wiper assembly including a housing member that is sized to be positioning about the one side rear-view mirror assembly to allow the one side rear-view mirror to be seated within. A wiper shield projecting outwardly from a side of the housing member and extending a vertical length of the housing. A wiper blade and a wiper arm are in communication. An arm control link is positioned adjacent the upper plate of the housing member and couples with the wiper arm. Finally, a motorized means is positioned within the housing member and has linking members coupled to a link pin that couples with the arm control link of the wiper arm to allow movable communication of the linking members with the wiper arm. The wiper arm with the arm control link provides pendulum fashion movement of the wiper blade across a mirror of the one side rear-view mirror.

20 Claims, 14 Drawing Sheets

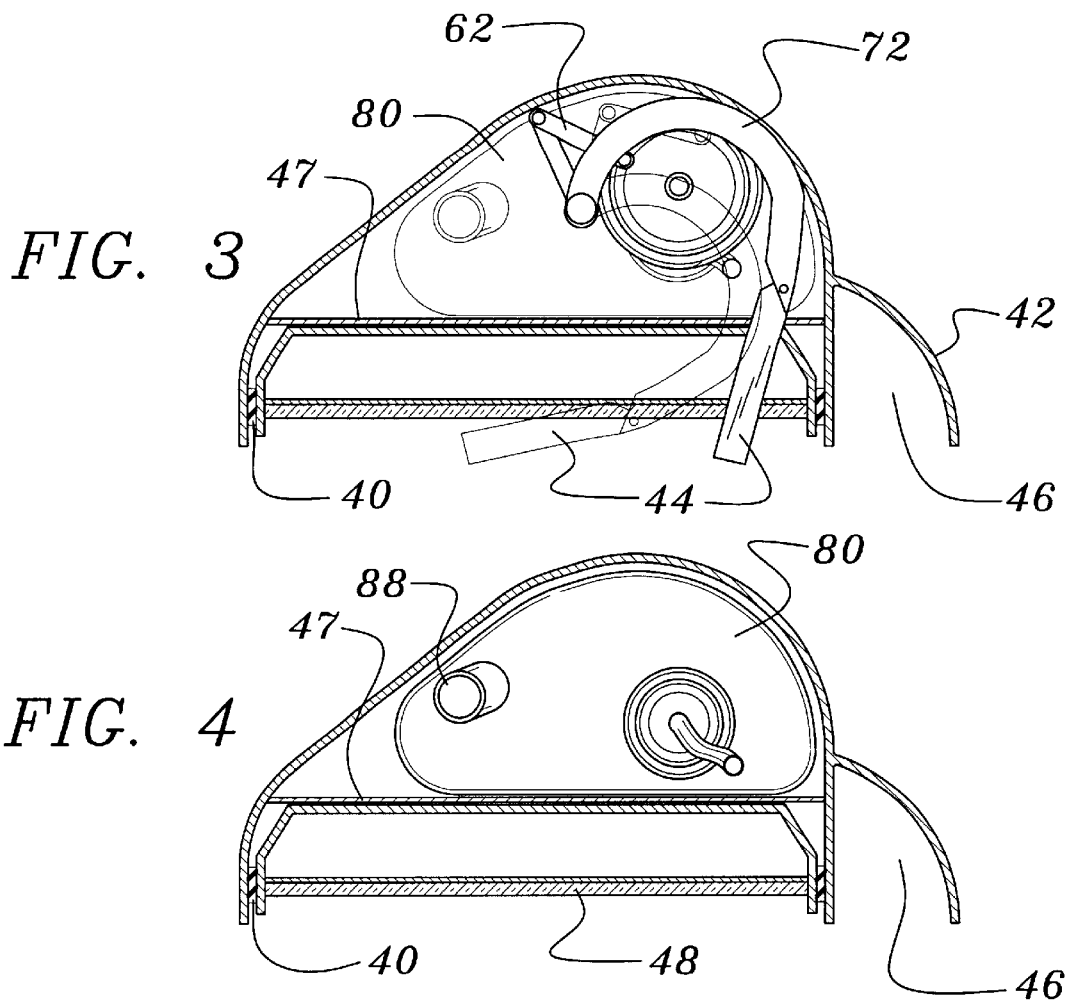
FIG. 3
FIG. 4
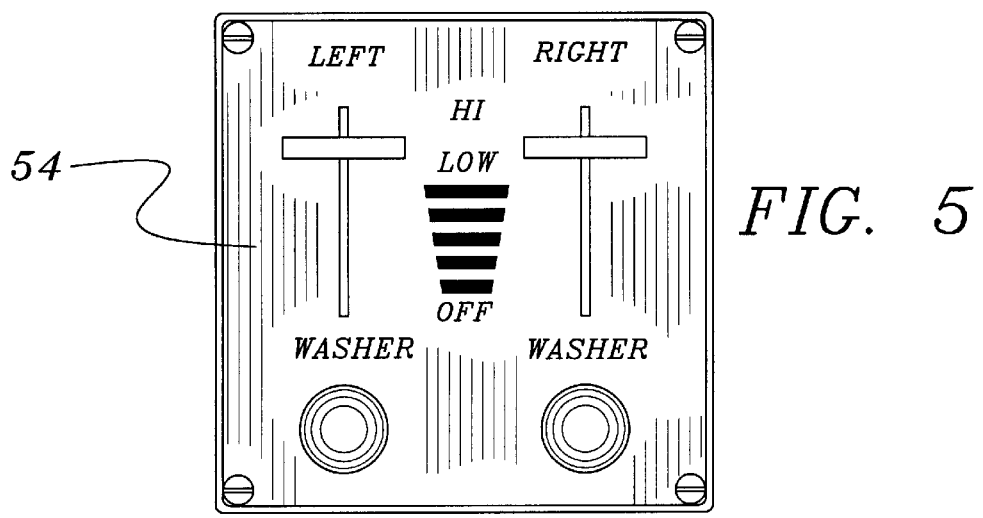
FIG. 5

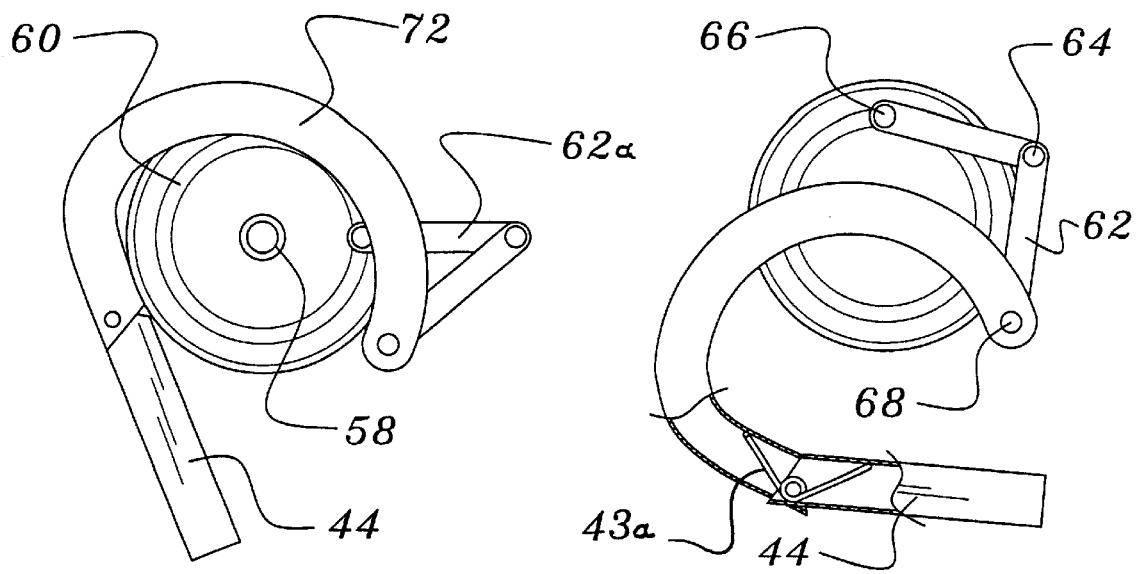
FIG. 6
FIG. 7
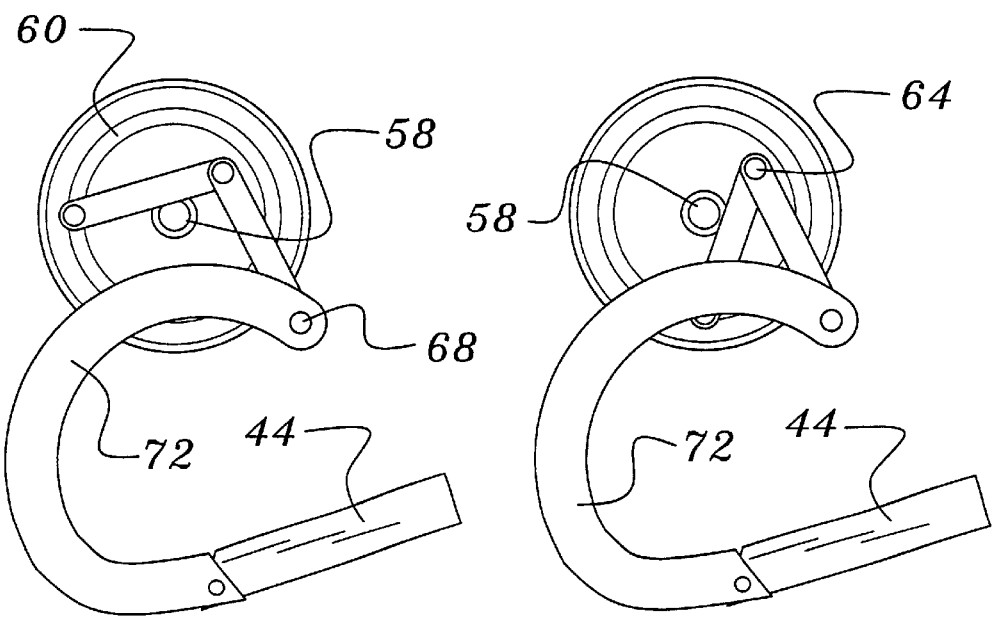
FIG. 8
FIG. 9

SIDE MOUNTED RETROFIT WIPER ASSEMBLY

RELATED U.S. APPLICATION

This application is a continuation-in-part of Ser. No. 09/250,121, filed Feb. 16, 1999, entitled "SIDE MOUNTED RETROFIT WIPER ASSEMBLY," abandoned, the contents of which are incorporated herein by reference.

BACKGROUND OF THE INVENTION

1. Field of the Invention

The present invention relates to a side mounted retrofit wiper assembly and, more particularly, pertains to providing a retrofit wiper assembly kit for attaching to the housing of a vehicle's side rear-view mirror.

2. Description of the Prior Art

The use of a rear side mirror wiper apparatus is known in the prior art. More specifically, rear side mirror wiper apparatus heretofore devised and utilized for the purpose of cleaning the rearview side mirror of a vehicle, specifically a truck, are known to consist basically of a side rear-view mirror built with a wiper unit and mounted to the door of the vehicle, with the wiper unit having a motor interior the housing to control the operation of the wiper across the mirror face.

By way of example, the prior art includes:

U.S. Pat No. 3,526,920 is an outside mounted rectangular rearview mirror having a vertical wiping blade with horizontal slots above and below the mirror portion. A drive and transmission means is disposed in a casing behind the mirror. The drive and transmission have wiper support members extending through the slots and in engagement with the upper and lower ends of the wiper to reciprocate the latter horizontally across the mirror. The motor, that operates the drive and transmission means, is mounted on the exterior of the front wall of the rear-view mirror.

U.S. Pat. No. 3,968,537 is a motorized wiping device for cleaning rear and side view mirrors of trucks, buses, trailers, and other heavy vehicles, in which the mirror is mounted externally on the vehicle. The invention is intended to wipe the mirrors off as needed. A drive housing is mounted to the top of the side view mirror. A motor, a slidable base member, and a guide plate are positioned within the housing. The wiper blade movable over the mirror, with a reciprocating coupling linkage from the motor to the wiper blade by movement of a wiper stem. The wiper stem is engaged by the slidable base member to move the wiper blade leftwards and rightwards along the mirror.

U.S. Pat. No. 4,339,169 is a rear view mirror and wiper assembly, which is mounted externally of the vehicle. The assembly includes a power operated wiper blade, and a continuously operating motor actuating a rotating crank arm, which is in rolling engagement with a mechanism fixedly engaged with the wiper blade in wiping engagement with the mirror surface. The mechanism includes a wiper-actuating arm, which translates the rotary motion of the crank arm to reciprocating linear motion of the wiper blade.

U.S. Pat. No. 4,466,712 is an external rear view mirror with drive mechanism interposed between the body shell for supporting a mirror and the member for attaching the body shell to the body of a motor vehicle, which allows a to-and-fro traversing movement of the body shell about a vertical axis. A wiper mechanism is provided for wiping the reflecting surface of the mirror. A single reversible electric motor is supported in the body shell for selective coupling to the drive mechanism or the wiper mechanism by respective clutches.

U.S. Pat. No. 4,672,708 is a wiper assembly for a mirror including a frame and a wiper arm mechanism. The wiper assembly has a manually operated remote control that is provided for actuating the wiper arm mechanism from the rest position to the stop position. The manually operated remote control is in the form of a Bowden wire.

U.S. Pat. No. 5,157,551 is a mirror wiper apparatus with a drive mechanism mounted within a sleeve, which is mounted vertically along one vertical edge of the frame. The sleeve is mounted vertically along one vertical edge of the frame. The sleeve has a slot, and a screw is mounted within the sleeve with a pair of spiral grooves of opposite pitch connected together at their upper and lower edges to form an oscillating path. A ring is slidably mounted on the screw with a pin. A motor drives the screw to cause the ring to oscillate vertically in the sleeve, and a wiper has an arm connected to the ring through the slot in the sleeve, so that the oscillation of the ring on the screw causes the wiper to oscillate upward and downward on the mirror.

U.S. Pat. No. 5,592,715 teaches a wiper assembly with a motor placed within the mirror housing. The wiper blade, according to the present invention, consists of a blade lever and a wiping string held as extended tight on one side of the blade lever. The width of the wiper blade is that of the blade lever. The mirror holder has formed thereon a wiper blade guide consisting of an ascending slope to lift away from the mirror surface the wiper blade having been moved to neat its reverse position and a vertical wall to land the wiper blade, having been thus lifted and reversed, from the lifted position above the mirror surface onto the mirror surface to a predetermined position where the wiper blade starts being moved back. Thus, the wiper blade can jump over the rainwater it has gathered by its forward movement and wipes it again along with new raindrops by its reverse movement.

U.S. Pat. No. 5,634,234 is a wiper assembly with a motor placed either above or below the mirror. The wiper accessory has a wiper blade, a drive module having a rotary drive and a flexible wiper arm for moving the wiper blade in a reciprocal movement across the reflective surface of the rear view mirror, and an auxiliary mirror mounted on the drive module for advantageously use of the sightless area adjacent the side mounted rear view mirror. The drive module further has a U-shaped bracket and two spaced apart vertical members having each a retaining pivot horizontally in line with one another for retaining the drive module of the wiper accessory in a rotatively adjustable manner about an axis defined by the two retaining pivots.

The prior art side rear-view mirror and wiper assemblies, as set out above, come as singular units housed in one assembly. These units are designed to replace the existing side rear-view mirror. As such, the truck driver wishing to have use of a side rear-view mirror with a wiper assembly is required to replace the entire side rear-view mirror. In many instances, the truck driver goes without a wiper assembly because the older the truck, the more difficult it is to find a side rear-view mirror with a wiper assembly that easily attaches to the truck doors. Therefore, a disadvantage of the prior art side rear-view mirror and wiper assemblies has been the difficulty in finding one that fits a variety of truck styles and the expense and difficulty of installing the side mirror replacements.

There are instances where the prior art teaches side rear-view mirrors with wiper drive modules that are attached to the top of the frame of the mirror housing. This mounting method creates a sightless area above each side mirror.

The side rear-view mirror retrofit wiper assembly, according to the present invention, substantially departs from the conventional concepts and designs of the prior art, and in so doing, provides an apparatus primarily developed for the purpose of providing a retrofit wiper assembly kit for attaching to the housing of a vehicle's side mirrors. The side rear-view retrofit wiper assembly of the present invention is structured to retrofit onto the rear of the mirror frame and eliminate the inconvenience caused by top mounting the wiper drive modules.

Therefore, it can be appreciated that there exists a continuing need for a side rear-view retrofit wiper kit with an assembly, which can be used to attach to the housing of a vehicle's existing side mirrors. In this regard, the present invention substantially fulfills this need.

SUMMARY OF THE INVENTION

Accordingly, a primary objective of the side rear-view mirror retrofit wiper assembly is to provide a retrofit wiper assembly kit that attaches to the housing of a vehicle's side rear-view mirror, specifically a truck side mirror, without obstructing the view of the driver. As such, the general purpose of the present invention will be described subsequently in greater detail.

To attain this, the retrofit wiper assembly kit of the present invention essentially comprises a housing member being sized for positioning about at least one side rear-view mirror. The housing member allows the one side rear-view mirror to be seated within. The housing has an upper plate member and a lower plate member with a housing body therebetween. A wiper shield may be interconnected to the housing body. The wiper shield is an option, and when added, will project outwardly from a side of the housing body. The wiper shield extends a vertical length of the housing member. A wiper blade is included. A wiper arm is in communication with the wiper blade and has an arm control link positioned adjacent the upper plate of the housing member. Lastly, a motorized means is positioned within the housing member. The motorized means has linking members coupled to a link pin. The link pin passes through the upper plate of the housing and couples with the arm control link of the wiper arm to allow movable communication between the linking members and the wiper arm. The communication between the linking members and the wiper arm allows pendulum fashion movement of the wiper blade across a mirror face of any one-side rear-view mirror of the vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a retrofit wiper assembly kit, for side rear-view mirrors, which has the advantage of providing a way to clean the mirror face of the side rear-view mirrors of various vehicles.

Another object of the present invention is to provide a retrofit wiper assembly kit, which may be easily and efficiently manufactured for attaching to a variety of side rear-view mirrors currently in use on various vehicles, specifically trucks.

A further object of the present invention is to provide a retrofit wiper assembly, which is of a durable and reliable construction for ease of mounting onto a variety of existing side rear-view mirrors.

An even further object of the present invention is to provide a retrofit wiper assembly which is susceptible of a low cost of manufacture with regard to both materials and labor, and which accordingly is then susceptible of low prices of sale to the consuming public, thereby making such side mounted wiper assembly kit economically available to the buying public.

Still another object of the present invention is to retrofit a wiper assembly kit to the housing of a side rear-view mirror or within the housing of a vehicle's side rear-view mirrors.

These together with other objects of the invention, along with the various features of novelty, which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood, and objects other than those set forth above will become apparent when consideration is given to the following detailed description thereof. Such description makes reference to the annexed drawings wherein:

FIG. 3 is a cross-sectional view of the housing member taken along line 3—3 of FIG. 2.

FIG. 4 is a cross-sectional view of the housing member taken along line 4—4 of FIG. 2.

FIG. 5 is a frontal view of the control panel.

FIG. 6 is a top plan view of the arm control link and the wiper arm in a pre-rest orientation and depicting the components of a left side vehicle mirror.

FIG. 7 is a top plan view, with a cut away portion to show the spring, of the arm control link and the wiper arm in an operable orientation, when in communication with the mirror of the left side of the vehicle.

FIG. 8 is a top plan view of the arm control link of the left side and the wiper arm in an operable orientation where movement is toward the mirror edge opposite the rest position.

FIG. 9 is a top plan view of the arm control link of the left side and the wiper arm in an operable orientation wherein the arm is moving back toward the rest position.

Similar reference characters refer to similar parts throughout the several views of the drawings.

DESCRIPTION OF THE PREFERRED EMBODIMENT

With reference now to the drawings, and in particular to FIGS. 1, 10, 13, 18 and 21 thereof, a retrofit wiper assembly kit for a side rear-view mirror embodying the principles and concepts of the present invention.

The present invention, the new and improved side rear-view mirror retrofit wiper assembly, is comprised of a plurality of components. Such components of the wiper assembly kit include in its broadest context a housing member, the internal components of the housing member, an arm control link, a wiper arm, a wiper blade and a motorized means. Such components are individually configured and correlated with respect to each other so as to attain the desired objective.

Figure 1:
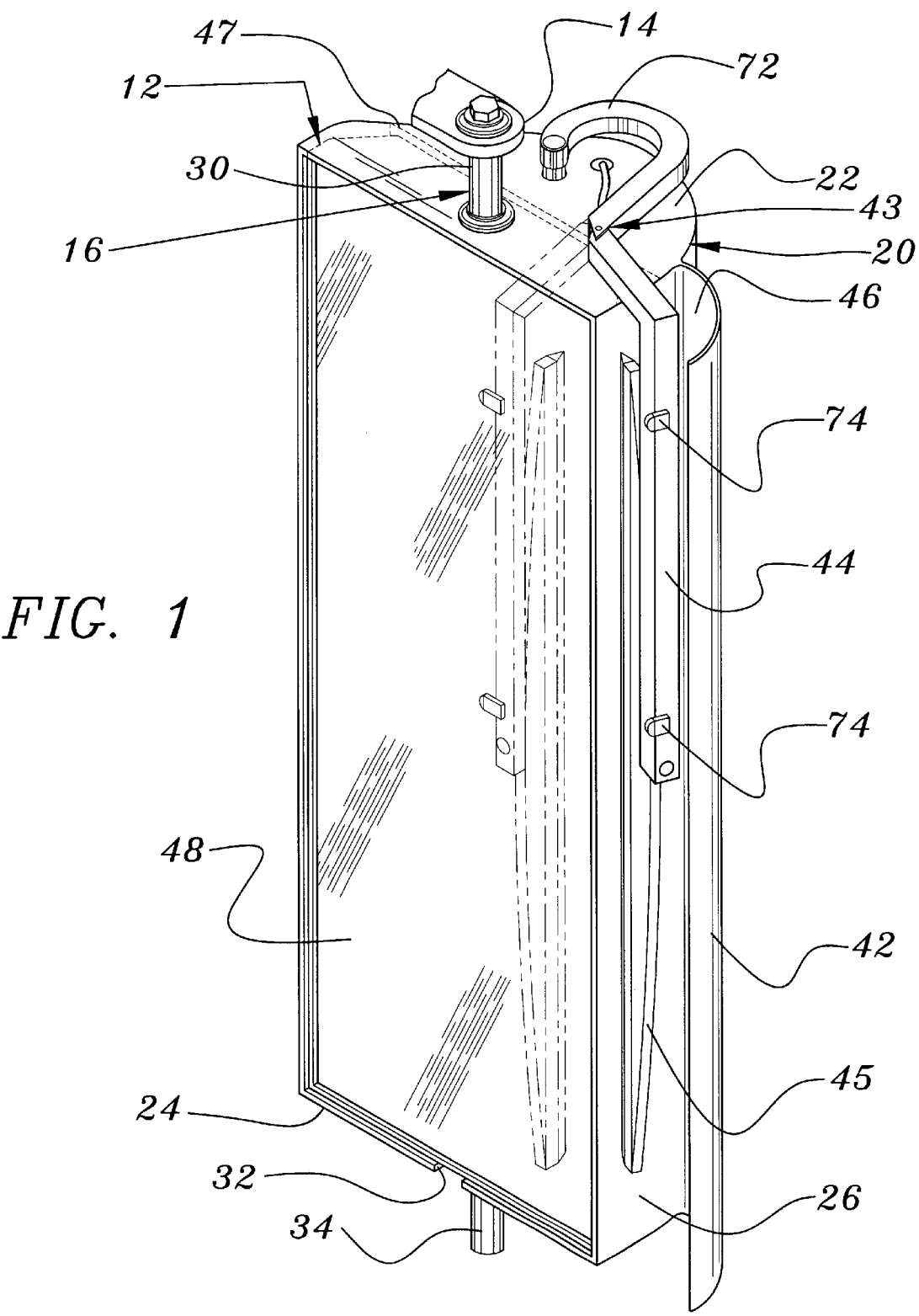
FIG. 1 is a perspective illustration of the first embodiment of the retrofit side mounted wiper assembly kit in an operable orientation in accordance with the principles of the present invention.

More specifically, the present invention of the first embodiment of the wiper assembly kit is coupled with at least one side rear-view mirror assembly 10, as shown in FIG. 1. In all cases, the vehicle is a truck that has left and right side rear-view mirror assemblies. In this instance, the side rear-view mirror has a generally rectangular shape mirror body 12. Each of the side rear-view mirror assemblies of the truck are mounted to the truck with a mounting bracket 14. Each mirror body is coupled to the mounting bracket with a mounting rod 16 that passes through the side rear-view mirror's body 12.

The wiper assembly kit has a housing member 20. The housing member is sized for positioning about the mirror body of one of the side rear-view mirror assemblies. The housing member allows the one side rear-view mirror to be seated within as seen in FIG. 1. The housing member is formed of any lightweight durable material like plastic or metal. The housing member is preformed to be a uniformed body structure.

Figure 2:
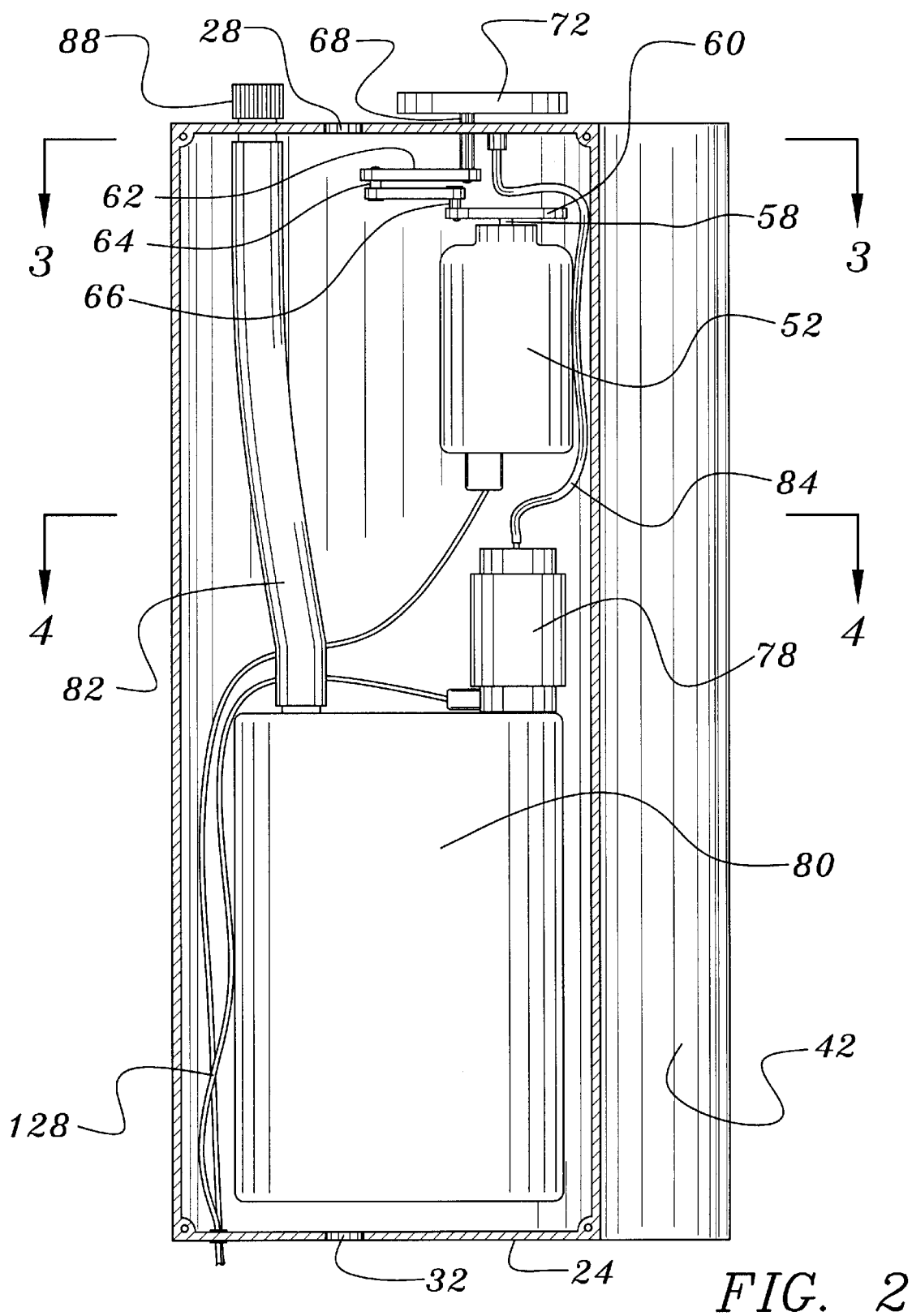
FIG. 2 is a cut-away view of the housing member showing the interior components of the wiper assembly.

The housing member has an upper plate member 22 and a lower plate member 24 with a housing body 26 therebetween. The upper plate of the housing member has an opening 28, as shown in FIG. 2, for receiving a first end of the mounting rod 30. The lower plate member has a slot 32 for slip fitting onto a second end 34 of the mounting rod. The opening and the slot allow the housing member, with the side rear-view mirror assembly, to fasten onto the one side rear-view mirror and the mounting bracket. An elasticized seal means 40 may be positioned about the mirror body prior to placement within the housing member or after positioning of the mirror body. The seal means, of FIG. 3 and 4, may be a silicon caulking or a gasket. The seal means will keep fluids from seeping into the interior of the housing member.

Figure 10:
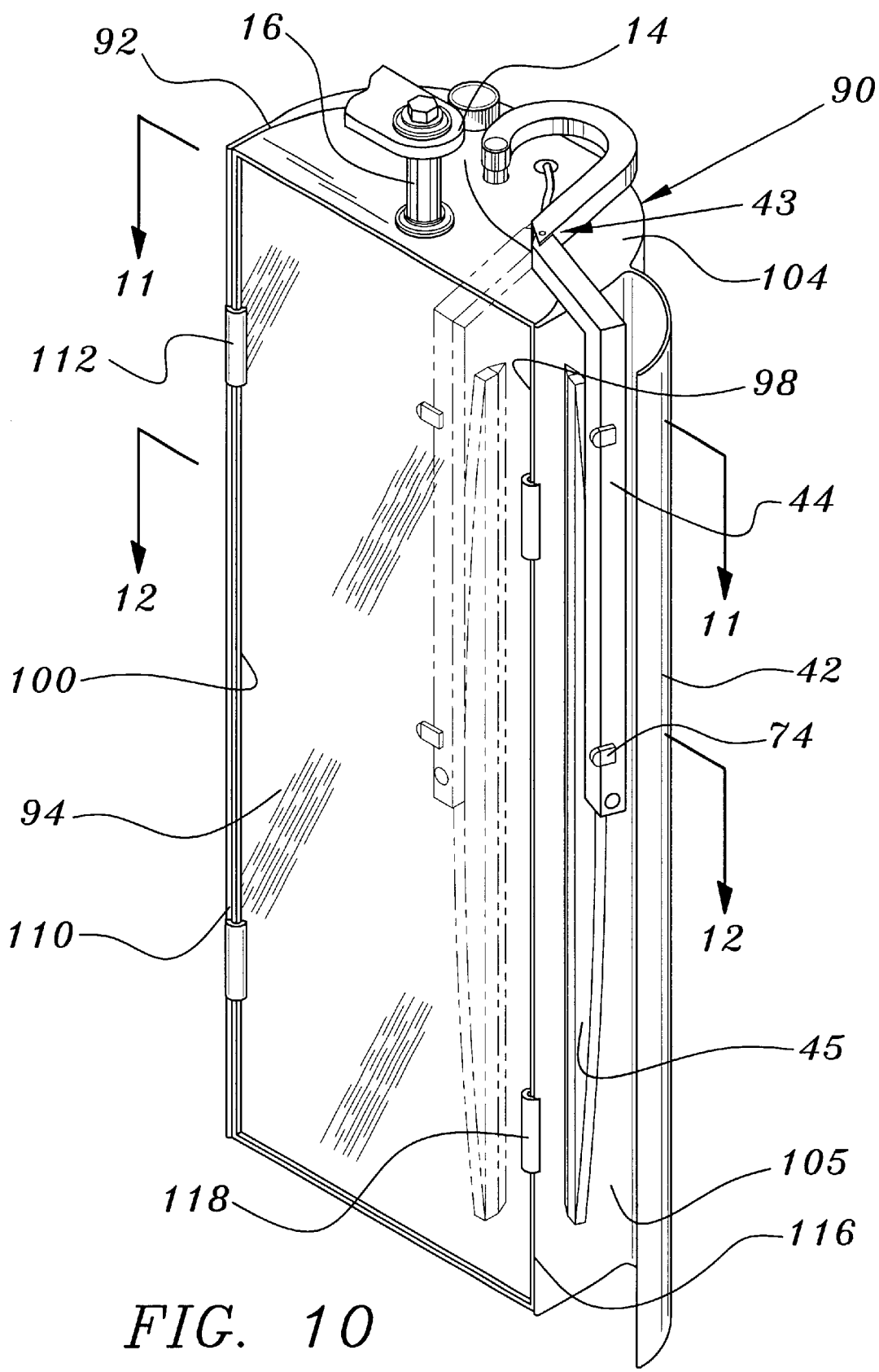
FIG. 10 is a perspective illustration of the second embodiment of the retrofit side mounted wiper assembly kit in an operable orientation in accordance with the principles of the present invention.

As illustrated in FIGS. 1 and 2, a wiper shield 42 is provided. The wiper shield is preformed onto the housing body 26 of the housing member 20. The wiper shield projects outwardly from a side of the housing body and extending a vertical length of the housing member. The wiper shield protects the wiper arm 44 from wind shear as the vehicle travels along at different speeds. When the wiper shield is not included the wiper blade 45 will rest against the mirror and juxtapose an interior edge of the mirror body when not in operation. When the wiper shield is included, the wiper blade is allowed to rest juxtapose the exterior side edge of the side wall of the housing body and nearest the entrance of the chamber 46 formed by the wiper shield's concave form, as seen in FIGS. 1 and 10. The wiper arm and wiper blade are not actually seated in the chamber of the wiper shield as it appears in FIGS. 1 and 10. Specifically, the placement of the wiper arm and wiper blade are illustrated by the dash markings of the figures. The wiper shield functions as a windbreaker to prevent the wiper arm from being torn away from the arm control link during movement of the vehicle.

Also, a cover plate 47, as seen in FIGS. 3 and 4, is provided. The cover plate is releasably coupled to the housing member to prevent movement of the internal components of the wiper assembly kit. A plurality of mounting screws are used to couple the cover plate to the housing member. The housing member has a plurality of receiving holes, along each corner, for threadably receiving the mounting screws (not shown).

Positioned within the housing member are the internal components that consist of a motorized means, a reservoir, a fluid pump and a fill tube. The motorized means controls the operation of a wiper blade as it moves across the mirror 48 of the side rear-view mirror assembly 10. The motorized means is a simple electric motor 52 commonly used to drive wipers in vehicles. The motor is controlled from within the vehicle by an interior control switch 54 that is retrofitted into the door panel or dash of the vehicle. The motor has a drive shaft 58 in communication with a disk drive 60. The disk drive engages the linking members 62 and 62a. The linking members are in movable communication with a coupling 64. The linking members are in movable communication with the disk drive 60 by way of a coupling 66. At least one of the linking members is coupled to a link pin 68. FIGS. 6, 6a, 7, 7a, 8, 8a, 9 and 9a show the disk drive moving the link members and the wiper arm. In FIGS. 6, 7, 8, and 9 the wiper movement is counterclockwise. In FIGS. 6a, 7a, 8a and 9a the wiper movement is clockwise as shown in FIG. 3.

In FIG. 2, the link pin 68 is shown passing through the upper plate 22 of the housing member to couple with an arm control link 72 of the wiper arm. Furthermore, as the motor causes the disk drive to move in a clockwise direction, as illustrated in FIGS. 6–9a, the linking member 62a is pulled by way of its attachment to coupling 66. When the linking member is pulled around, linking member 62 is also pulled along and rotates about coupling 64. The movement of the linking members 62 and 62a in turn moves the arm control link, which is fixedly attached to another end of the link pin. The rocking motion of the arm control link moves the wiper arm back and forth across the mirror. The link pin allows movable communication to extend from the linking members to the wiper arm for pendulum fashion movement of the wiper blade across the mirror 48 of the one side rear-view mirror assembly when the drive shaft moves the disk drive. Further, the link pin locks together the arm control link 72 with the adjacent linking member 62 to control the wiper arm movement. Therefore, as the adjacent linking member 62 moves, in response to the movement of linking member 62a, the arm control link moves the same distance. The movement of the arm control link pulls the wiper arm back and forth. Once the motor is turned off, the arm control link controls the resting place of the wiper blade. The motor is stationary, as the disk drive moves clockwise or counterclockwise, and the linking members move about the coupling 64 to move the arm control link which in turn moves the wiper arm to move the wiper blade across the mirror.

Figures 6A, 7A:
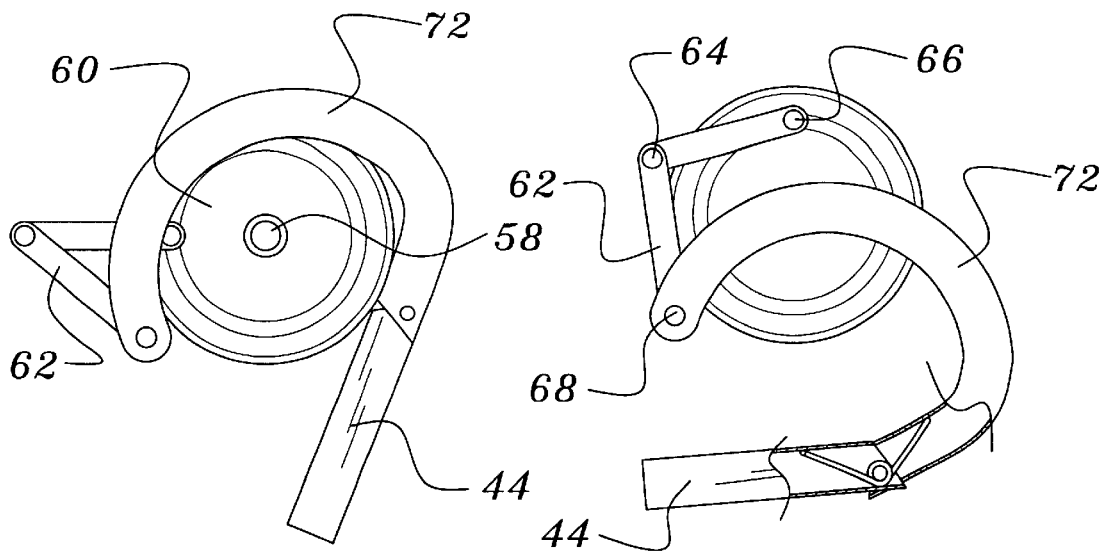
FIG. 6a is a top plan view of the arm control link and the wiper arm in a pre-rest orientation and depicting the components of a right side vehicle mirror.
FIG. 7a is a top plan view, with a cut away portion to show the spring, of the arm control link and the wiper arm in an operable orientation, when in communication with the mirror of the right side of the vehicle.
Figures 8A, 9A:
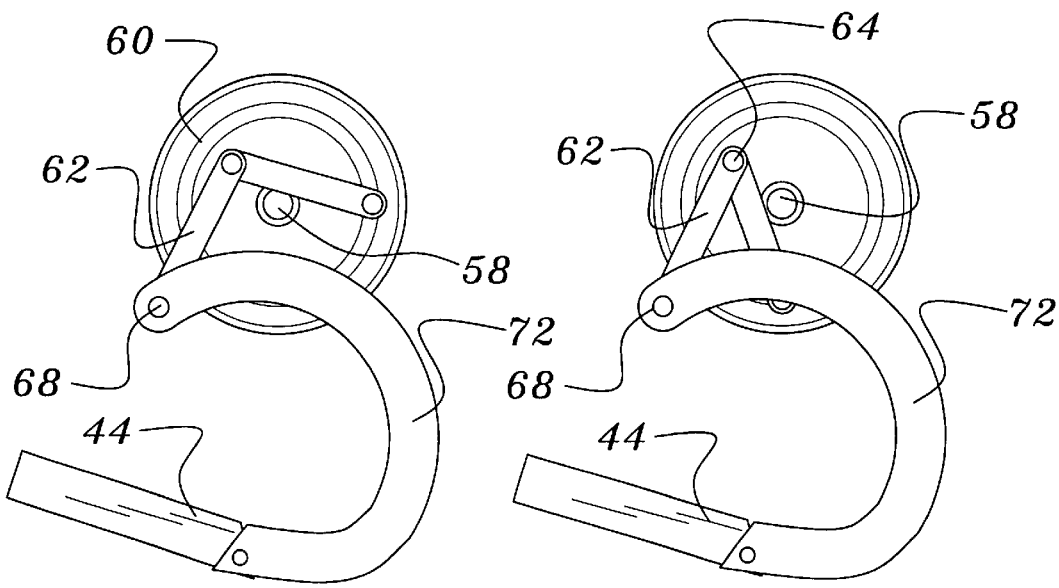
FIG. 8a is a top plan view of the arm control link of the right side and the wiper arm in an operable orientation where movement is toward the mirror edge opposite the rest position.
FIG. 9a is a top plan view of the arm control link of the right side and the wiper arm in an operable orientation wherein the arm is moving back toward the rest position.

The mirror wiper is comprised of the arm control link 72, the wiper arm 44 and a pin at 43 to connect the arm control link and the wiper arm, and a wiper blade. As shown in FIGS. 7 and 7a, a spring 43a is arranged to bias the wiper blade against the mirror 48 to wipe its face and prevents the wiper arm from swinging uncontrollably with the movement of the arm control link. In the event the arm control link pulls the wiper arm slightly beyond the interior edge of the mirror body and onto the exterior side edge of the side wall of the housing body, when the motor is turned off, the spring allows the wiper arm to spring back onto the mirror when the motor is turned on. The spring allows the wiper arm to bias just enough to be lifted over the exterior side edge as the arm link is pulled by the motion of the linking members. The wiper arm is formed of standard material and is in communication with the wiper blade 45. The arm control link 72 is positioned adjacent the upper plate of the housing member. The wiper arm has at least one nozzle 74 attached for fluid dispersion. Preferably the wiper arm will have two nozzles proportionally spaced apart for a greater fluid dispersion onto the mirror to aid with cleaning by the wiper blade. During operation of the wiper and as it moves across the mirror to wipe the mirror, the wiper blade moves vertically along the mirror surface a distance corresponding to the length of the wiper arm. The wiper arm pivots about the pin at 43, with the spring applying tension so to always allow the blade to remain on the surface of the mirror. There is only minimal movement of the wiper arm away from the mirror, and such movement is compensated for by the spring constantly urging the wiper arm to remain aligned with the axis of the arm control link. Further, the length of that portion of the wiper arm, between the point of connection with the arm control link to the bend, is such that only a limited amount of space between the wiper arm and the mirror is provided. The spacing is just enough to allow a wiper blade, once coupled to the wiper arm to rest on the mirror. Furthermore, the components of the wiper blade are standard. This means that the wiper blade may be held to the wiper arm with a U-shaped holder. Most notably, the wiper blade generally used in this invention is composed of a rubber blade and a plurality of holding levers and is connected to the wiper arm with a clip. The components that connect the wiper blade to the wiper are standard and assist with the constant contact of contact of the wiper blade with the mirror.

The other operable component included within the housing member is a fluid pump 78; a fluid reservoir 80 and a fill tube 82 are vital to the operation of the wiper assembly kit. The fluid pump is spaced from the motor and is coupled with the fluid reservoir. The fluid pump has fluid release line 84. The fluid release line is extended from the fluid pump within the housing member and exits at the upper plate to couple with the nozzle/nozzles, as shown in FIG. 1. When the reservoir is empty, a cap 88 on the fill tube is removed, and water or windshield cleaning fluid may be used to refill the reservoir.

Figure 11:
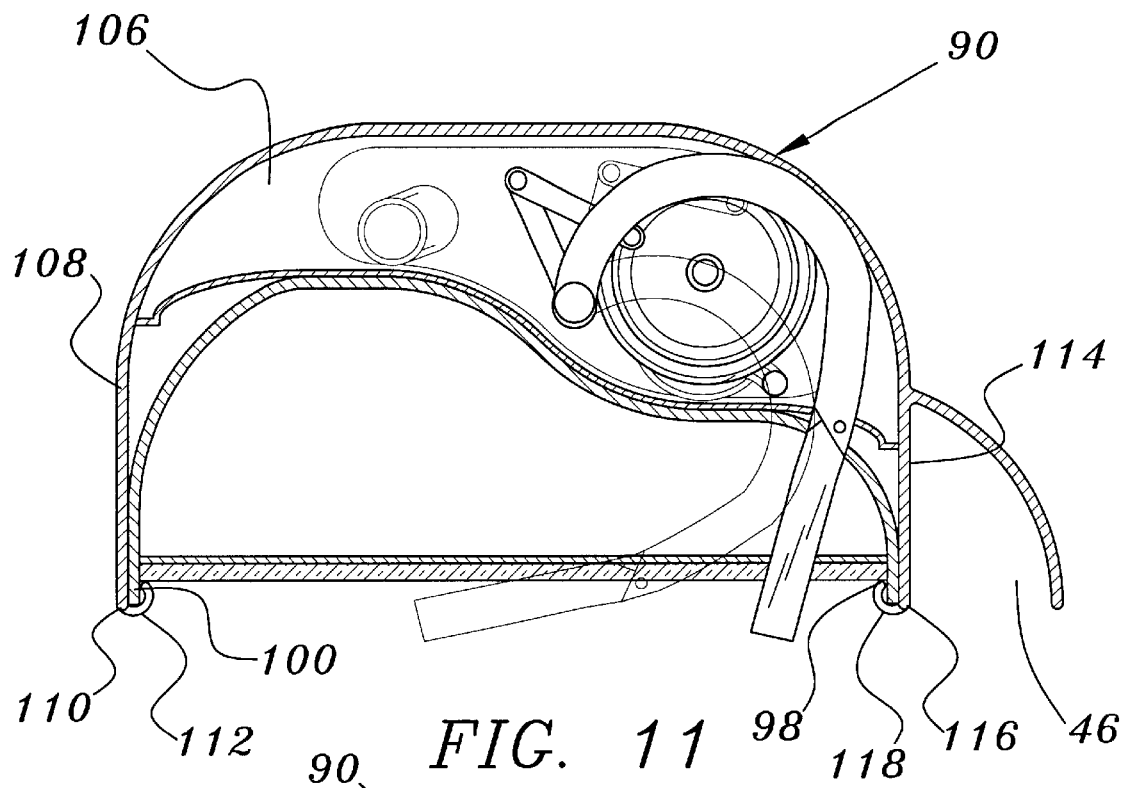
FIG. 11 is a cross-sectional view of the housing member taken along line 11—11 of FIG. 10.
Figure 12:
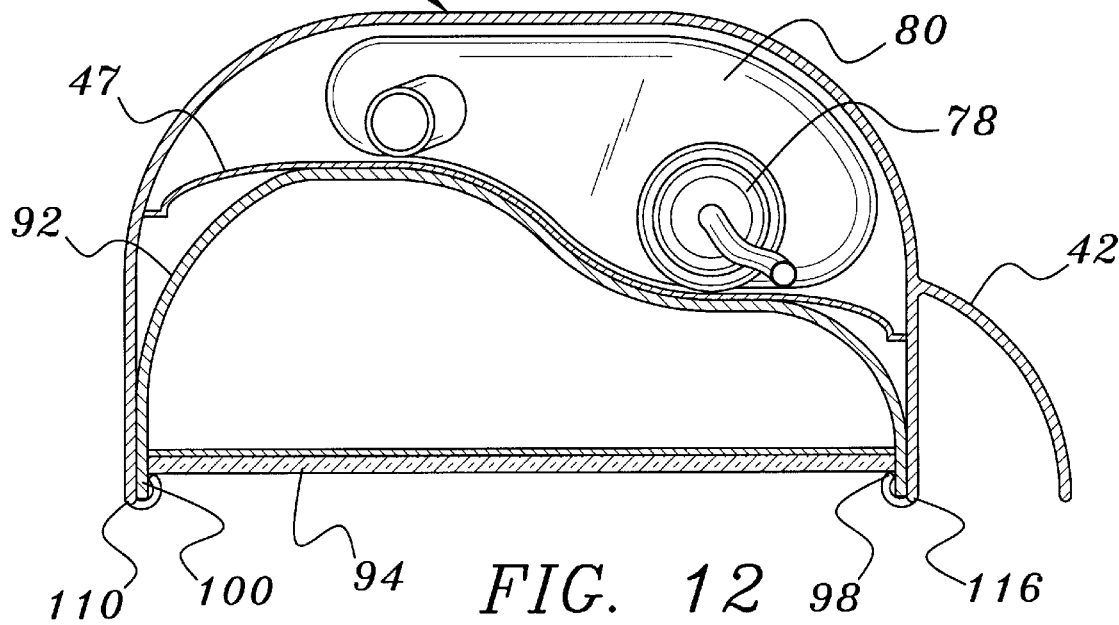
FIG. 12 is a cross-sectional view of the housing member taken along line 12—12 of FIG. 10.

The second embodiment of the wiper assembly kit, as shown in FIGS. 10, 11 and 12 has a housing member 90. In this instance, the side rear-view mirror assembly has an aerodynamic shape mirror body 92. Like the mirror assembly discussed above, a mounting rod 16 couples with a mounting bracket 14 to mount the mirror assembly to a vehicle. The mirror 94 of side rear-view mirror assembly 10 is recessed within the mirror body 92 and forms a right side flange 98 and a left side flange 100.

The second embodiment-housing member is sized to be positioned about the one side rear-view mirror and allows the one side rear-view mirror to be seated within. The housing member has an upper side 104 and a lower side 106, as seen in FIGS. 11 and 12, with a housing body 105 therebetween. The housing member has a left sidewall 108 with a left side edge 110 with a pair of left side clamps 112. The housing member has a right sidewall 114 with a right side edge 116 with a pair of right side clamps 118. The left side wall and the right side wall of the housing member are flush with the mirror body, as depicted in FIGS. 11 and 12, so to provide a fluid tight seal.

The pair of left side clamps 112 engages the left side flange 100 when the mirror body is seated within the housing member. The pair of right side clamps 118 engages the right side flange 98 when the mirror body is seated within the housing member.

Each clamp of the pair of clamps is formed of a flexible material for resilient engagement of the respective flange of the mirror body. The right side clamps of the housing member snap fit onto the right flange and the left side clamps of the housing member snap fit onto the left flange. The right side clamps and the left side clamps secure the housing member about the mirror body of the side rear-view mirror assembly, as shown in FIG. 10.

The housing body of the housing member of the second embodiment has a wiper shield 42 like the shield of the first embodiment. The wiper shield projects outwardly from the housing body and extends along a vertical length of the housing. Also, the housing member of the second embodiment has the same operable components as the first embodiment and as shown in FIG. 2. That is a motorized means 52, a fluid pump 78, a fluid reservoir 80, a fill tub 82 and a fluid release line 84. Also, a cover plate 47 is included. Further, the wiper blade is moved across the mirror in the same operable way as in the first embodiment and as depicted in FIGS. 6–9a.

Figure 13:
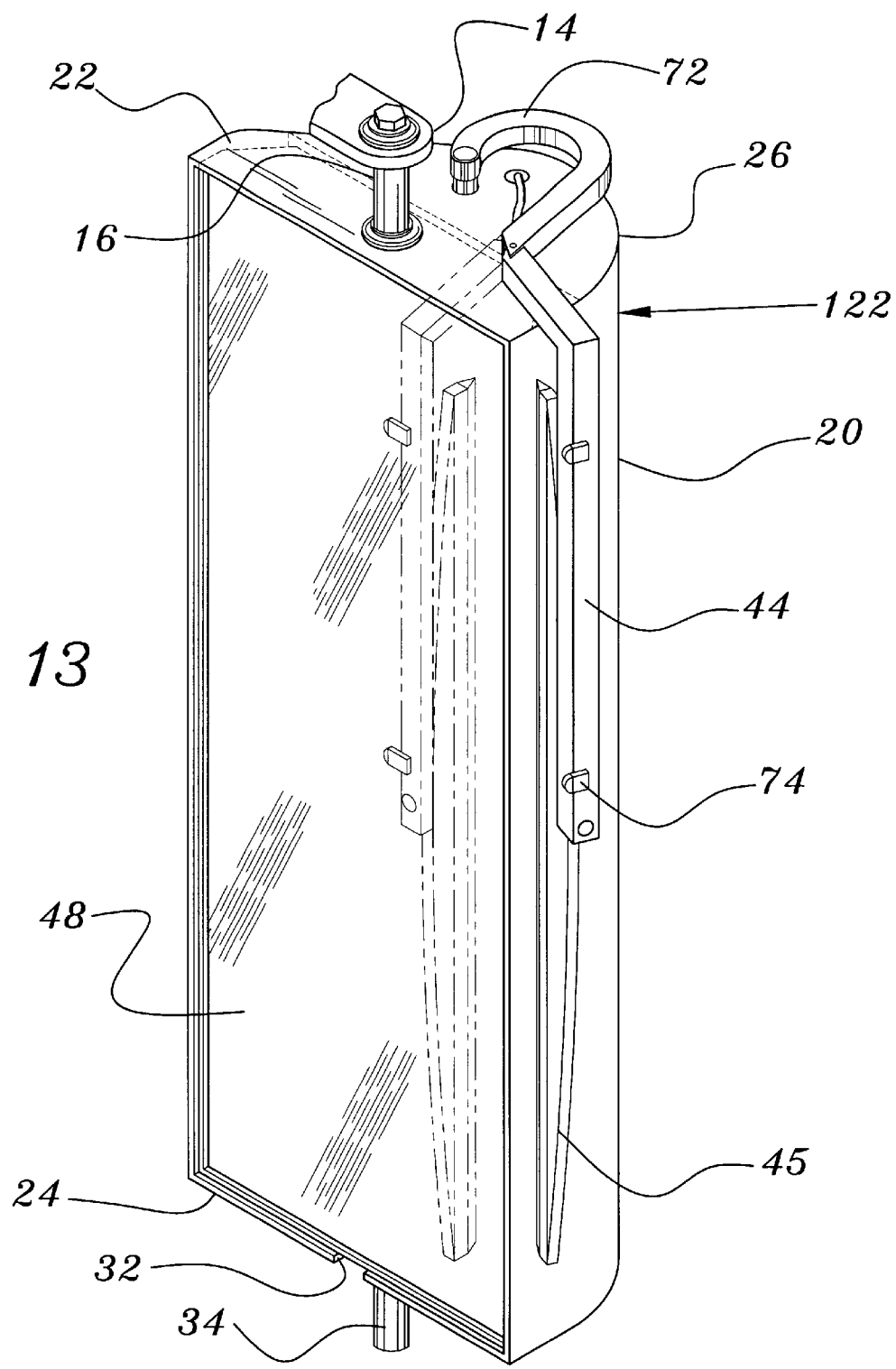
FIG. 13 is a perspective illustration of the third embodiment of the retrofit side mounted wiper assembly kit in an operable orientation in accordance with the principles of the present invention.
Figure 14:
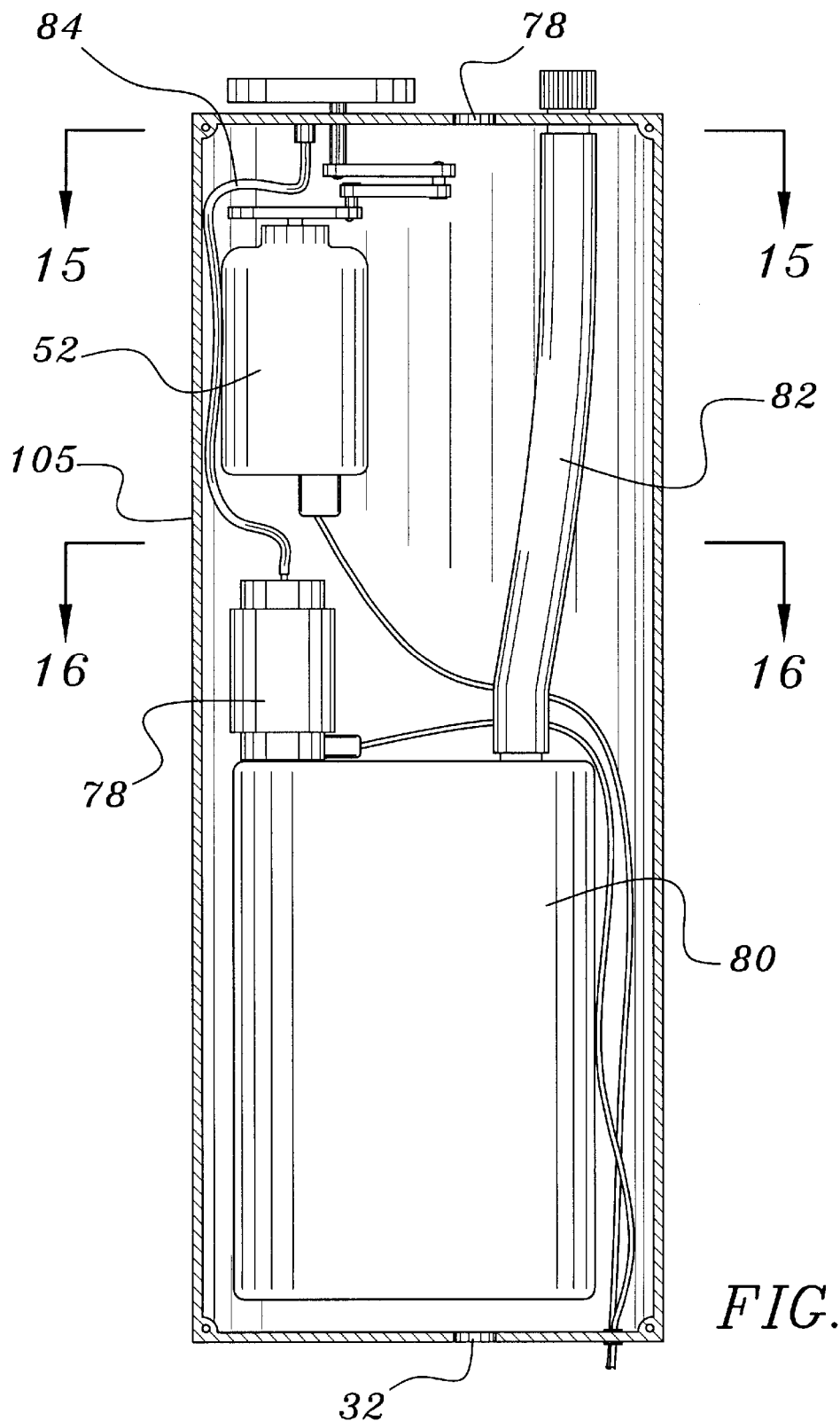
FIG. 14 is a cut-away view of the housing member of the third embodiment, showing the interior components of the wiper assembly.
Figure 15:
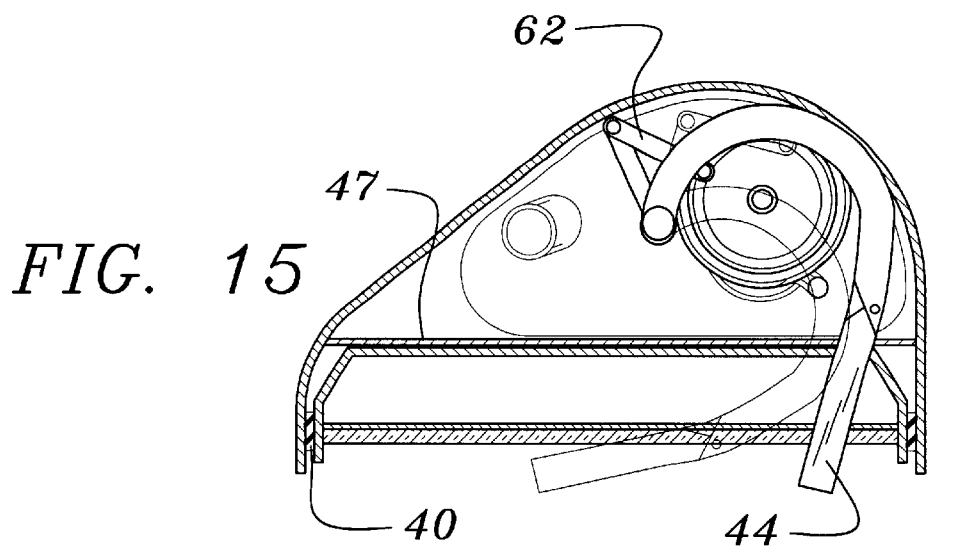
FIG. 15 is a cross-sectional view of the housing member taken along line 15—15 of FIG. 14.
Figure 16:
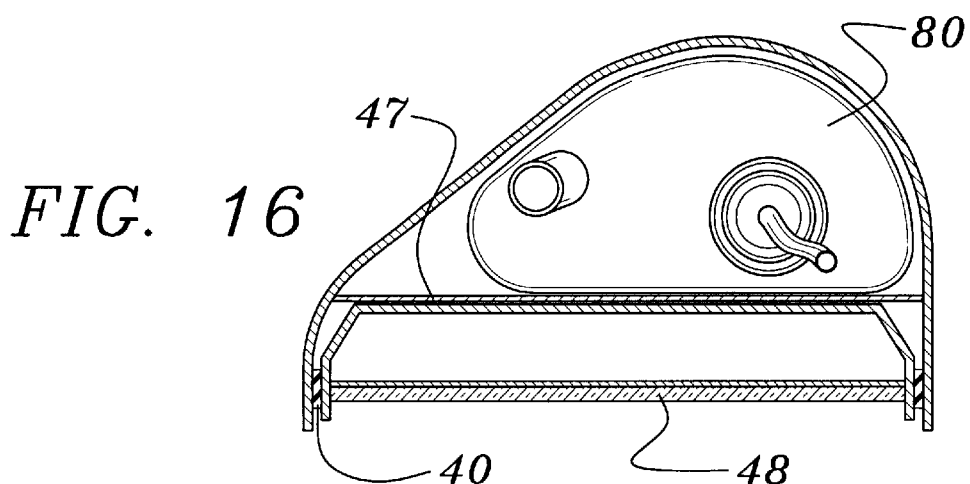
FIG. 16 is a cross-sectional view of the housing member taken along line 16—16 of FIG. 14.
Figure 17:
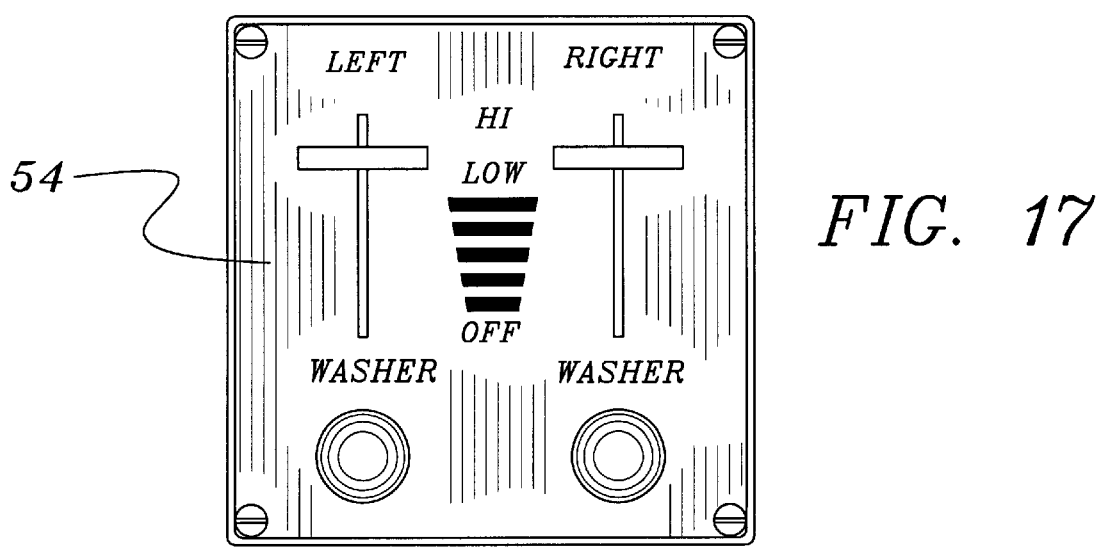
FIG. 17 is a frontal view of the control panel for the third embodiment of the present invention.
Figure 18:
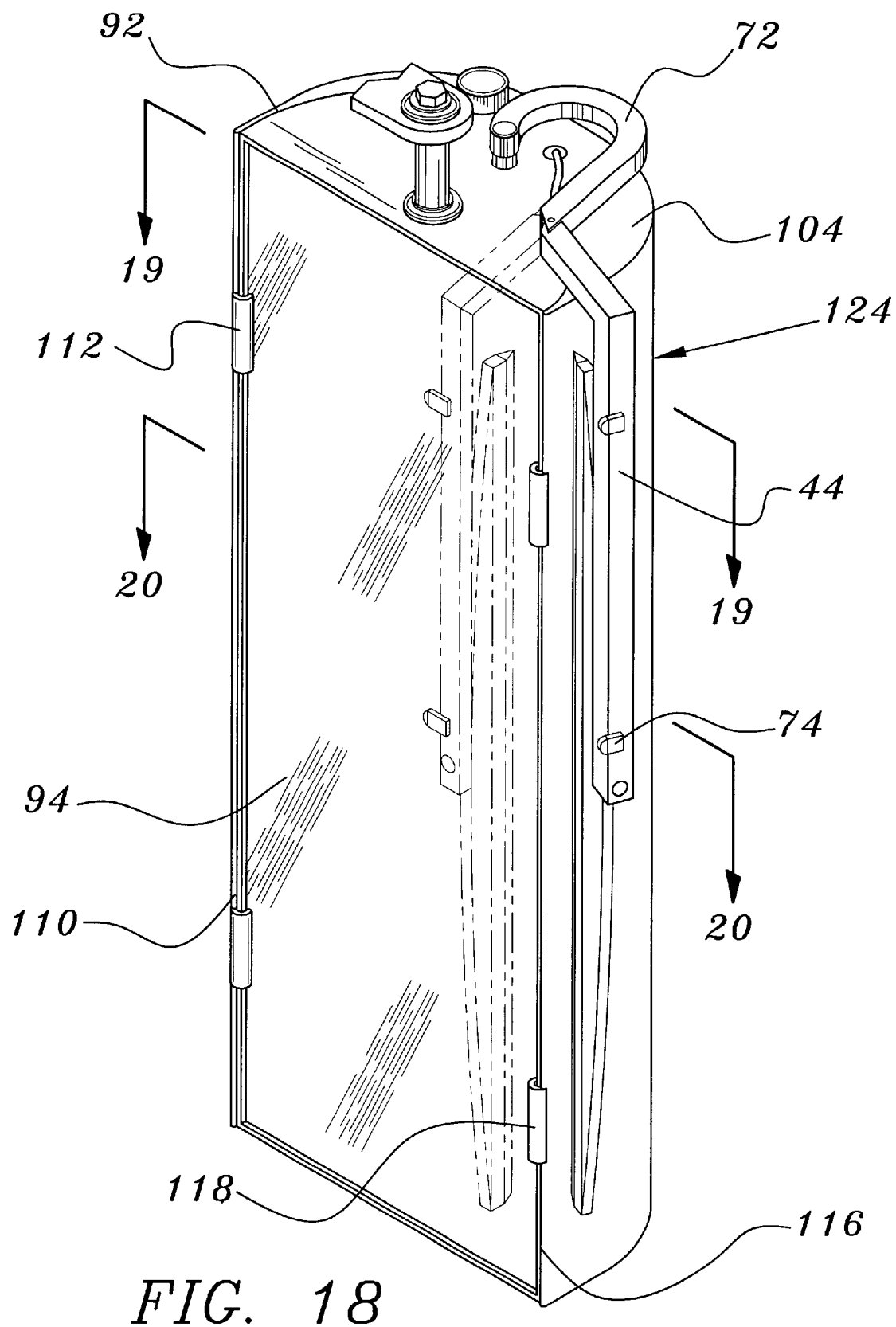
FIG. 18 is a perspective illustration of the fourth embodiment of the retrofit side mounted wiper assembly kit in an operable orientation in accordance with the principles of the present invention.
Figure 19:
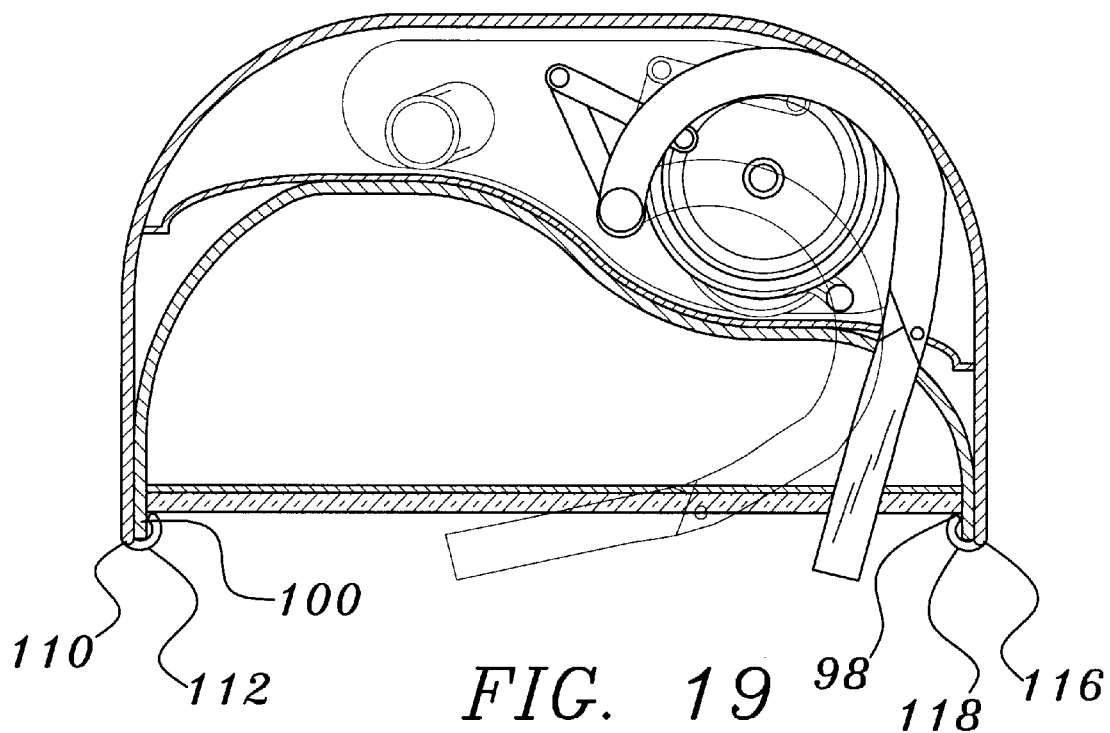
FIG. 19 is a cross-sectional view of the housing member taken along line 19—19 of FIG. 18.
Figure 20:
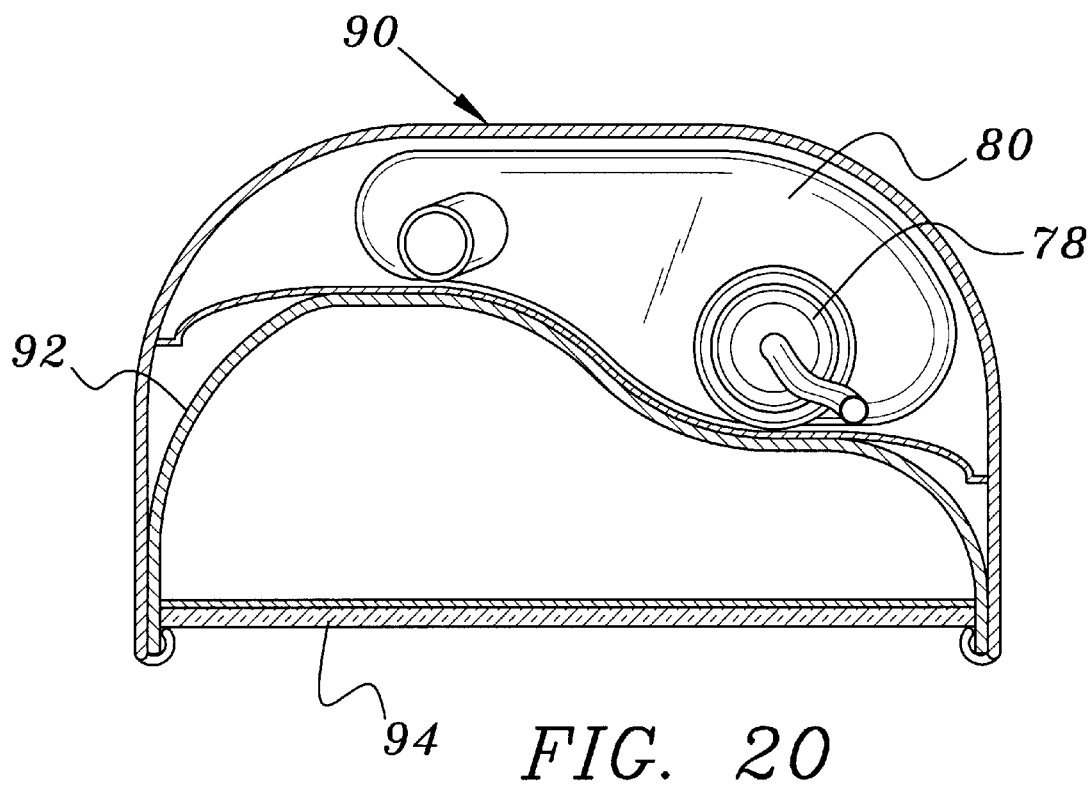
FIG. 20 is a cross-sectional view of the housing member taken along line 20—20 of FIG. 18.

The third 122 and fourth embodiments 124 as depicted in FIGS. 13 and 18 are similar in form to the embodiments of FIGS. 1 and 10. The differences between the four embodiments, as seen in FIGS. 13 and 18, are that they do not include the wiper shield 42. In all other respects, the third and fourth embodiments include the same general operable interior components and the wiper blade is operated in the same general manner. The general components of the third and fourth embodiments are found in FIG. 14.

When attaching the wiper assembly kit to the existing side rear-view mirror of FIGS. 1 and 13, the housing member couples with the mounting rod 16. When attaching the wiper assembly kit of FIGS. 10 and 18, the clamps 112 and 118 fasten the housing member to the mirror body. In the case of FIGS. 1, 10, 13, and 18, the mirror body is loosened from the mounting bracket by removing the top bolt and loosening the bottom bolt. The rear of the mirror body is cleaned and the housing member of the wiper assembly kit is placed in position around the mirror body. Prior to this, the user will run any electrical wires 128 from the motor 52 to the inside of the truck cab for attaching to the fuse box and the interior control panel 54.

Figure 21:
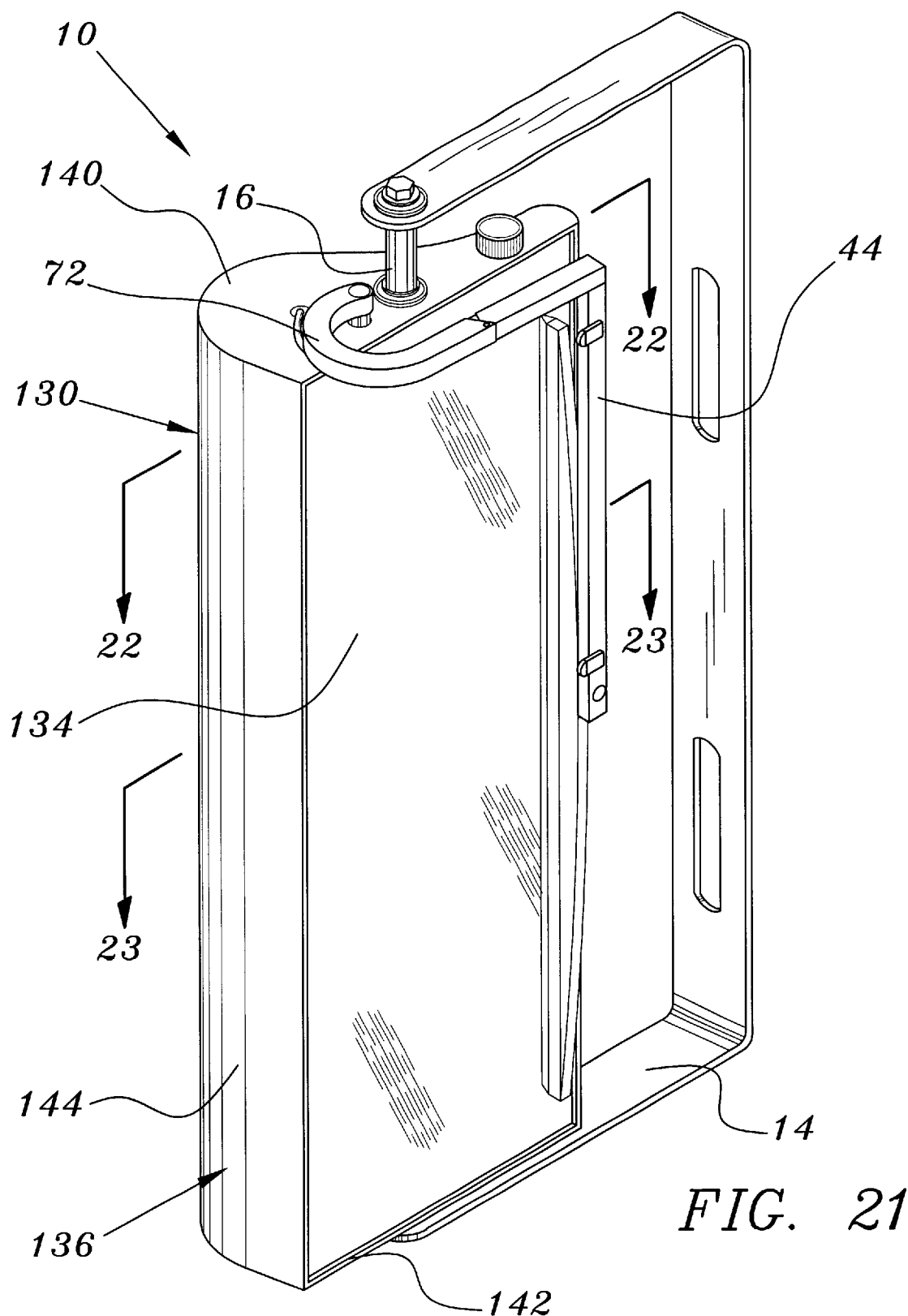
FIG. 21 is a perspective illustration of the fifth embodiment of the retrofit side mounted wiper assembly kit in an operable orientation in accordance with the principles of the present invention.

In FIG. 21, a fifth embodiment 130 is shown. The fifth embodiment has a wiper assembly kit positioned within at least one side rear-view mirror assembly. In this instance, the shape of the mirror body is generally aerodynamic and has a mirror 134 and a mirror housing 136. The mirror housing has a first plate member 140 and a second plate member 142 with a body portion 144 therebetween.

As set out above, there is a left side rear-view mirror assembly and a right side rear-view mirror assembly. Each of the side rear-view mirror assemblies of the truck is mounted to the truck with a mounting bracket. Each mirror body is coupled to the mounting bracket 14 with a mounting rod 16 that passes through the side rear-view mirror's housing and adjacent to the housing member 148 within.

Figure 22:
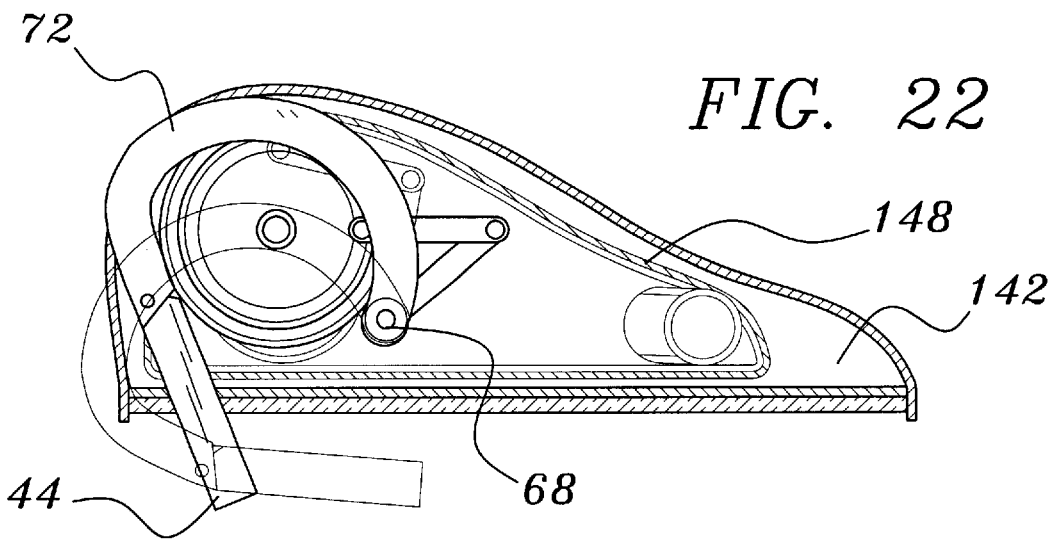
FIG. 22 is a cross-sectional view of the housing member taken along line 22—22 of FIG. 21.
Figure 23:
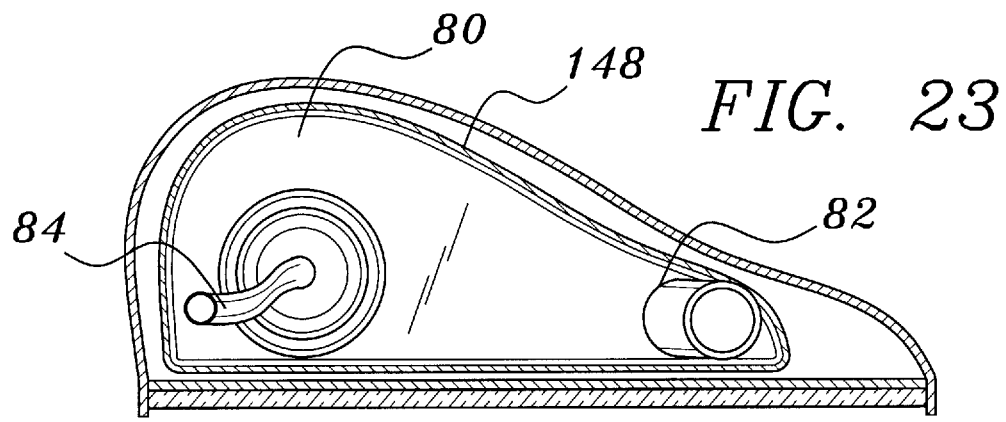
FIG. 23 is a cross-sectional view of the housing member taken along line 23—23 of FIG. 21.
Figure 24:
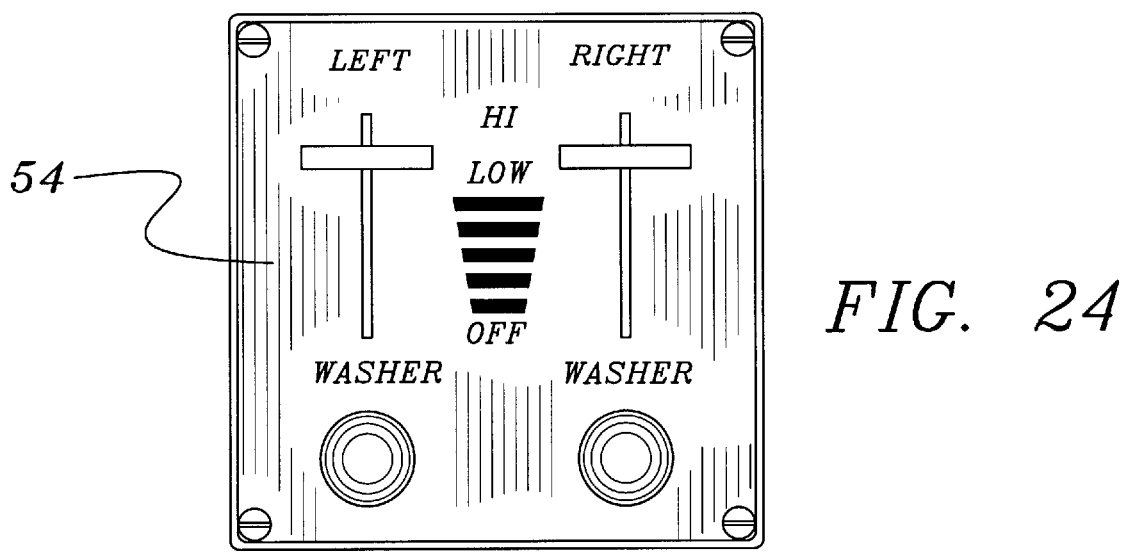
FIG. 24 is a frontal view of the control panel for the fifth embodiment of the present invention.

A motorized means 52 is positioned within the housing member 148 of the wiper assembly kit of the fifth embodiment. The housing member is encased within the mirror housing behind the mirror, as illustrated in FIGS. 22 and 23. The operation of the motorized means, once the housing member is in place within the mirror housing, is like the operation of the wiper assembly of FIGS. 2, 6–9a, and 14.

When assembling the side rear-view mirror and wiper assembly kit of the fifth embodiment, holes must be bored into the first plate member 140. These additional holes are for allowing the fluid release line 84, the link pin 68 and the top of the fill tube 82 to exit for operation of the wiper assembly.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, equitably entitled.

What is claimed is:

1. A vehicle side rear-view mirror retrofit wiper assembly for a side rear-view mirror assembly comprising:

a housing member being sized for positioning about said side rear-view mirror assembly and allowing the side rear-view mirror to be seated therein, the housing having an upper plate member and a lower plate member with a housing body therebetween, a wiper shield projecting outwardly from a side of the housing body and extending a vertical length of the housing;

a wiper blade;

a wiper arm being in communication with the wiper blade and having an arm control link positioned adjacent the upper plate of the housing member;

a motorized means positioned within the housing member and having a drive shaft coupled to a means for communicating with linking members, the linking members are in movable communication by way of a coupling and coupled to a link pin, the link pin passing through the upper plate of the housing and lockingly coupled with the arm control link of the wiper arm for allowing movable communication to extend from the means for communicating with the linking members to the linking members then to the wiper arm for pendulum fashion movement of the wiper blade across a mirror of the side rear-view mirror assembly; and a biasing means positioned at the coupling point between the arm control link and the wiper arm to control the movement of the wiper arm and constantly urge the wiper blade against the surface of the mirror of the side rear-view mirror assembly.

2. The vehicle side rear-view mirror retrofit wiper assembly as set forth in claim 1, wherein the side rear-view mirror assembly having a mirror body with a generally rectangular shape and having a mounting rod for coupling with a mounting bracket of a vehicle, said housing member shaped to receive said generally rectangularly shaped mirror body.

3. The vehicle side rear-view mirror retrofit wiper assembly as set forth in claim 2, wherein the upper plate of the housing member having an opening for receiving a first end of the mounting rod, and the lower plate having a slot for slip fitting onto a second end of the mounting rod for fastening the housing member onto the side rear-view mirror assembly.

4. The vehicle side rear-view mirror retrofit wiper assembly as set forth in claim 1, wherein the motorized means is an electric motor with the drive shaft, the means for communicating with the linking members is a disk drive that engages the linking members, and the biasing means includes a spring arranged to urge the wiper arm towards the mirror.

5. The vehicle side rear-view mirror retrofit wiper assembly as set forth in claim 4, wherein the motorized means is in electrical communication with an interior control switch.

6. The vehicle side rear-view mirror retrofit wiper assembly as set forth in claim 1 wherein a fluid pump and fluid reservoir are encased within the housing member and spaced from the motorized means.

7. The vehicle side rear-view mirror retrofit wiper assembly as set forth in claim 6, wherein the reservoir having a fill tube projecting therefrom and exiting the housing member about the upper plate.

8. The vehicle side rear-view mirror retrofit wiper assembly as set forth in claim 6, wherein the pump having a fluid line in communication with at least one nozzle attached to the wiper arm.

9. A vehicle side rear-view mirror retrofit wiper assembly for a side rear-view mirror assembly comprising:
  a housing member being sized for positioning about said side rear-view mirror assembly and allowing the side rear-view mirror to be seated therein, the housing member having an upper side and a lower side with a housing body therebetween, the housing having left side edge with a pair of left side clamps and a right side edge with a pair of right side clamps, the housing body having a wiper shield projecting outwardly therefrom and extending a vertical length of the housing;
  a wiper blade;
  a wiper arm being in communication with the wiper blade and having an arm control link positioned adjacent the upper side of the housing member;
  a motorized means positioned within the housing member and having a drive shaft coupled to a means for communicating with linking members, the linking members are in movable communication by way of a coupling and coupled to a link pin, the link pin passing through the upper side of the housing and lockingly coupled with the arm control link of the wiper arm for allowing movable communication to extend from the means for communicating with linking members to the linking members then to the wiper arm for pendulum fashion movement of the wiper blade across a mirror of the side rear-view mirror assembly; and
  a biasing means positioned at the coupling point between the arm control link and the wiper arm to control the movement of the wiper arm and constantly urge the wiper blade against the surface of the mirror of the side rear-view mirror assembly.

10. The vehicle side rear-view mirror retrofit wiper assembly as set forth in claim 9, wherein the side rear-view mirror assembly having a mirror body having an aerodynamic shape and having a mounting rod for coupling with a mounting bracket of a vehicle, and a mirror being recessed therein to form a right side flange and a left side flange said housing member shaped to receive said aerodynamically shaped mirror body.

11. The vehicle side rear-view mirror retrofit wiper assembly as set forth in claim 10, wherein the right side clamps of the housing member snap fitting onto the right flange and the left side clamps of the housing member snap fitting onto the left flange, the right side clamps and the left side clamps secure the housing member about the side rear-view mirror assembly.

12. The vehicle side rear-view mirror retrofit wiper assembly as set forth in claim 9, wherein the motorized means is an electric motor with the drive shaft, the means for communicating with the linking members is a disk drive that engages the linking members, and the biasing means includes a spring arranged to urge the wiper arm towards the mirror.

13. The vehicle side rear-view mirror retrofit wiper assembly as set forth in claim 12, wherein the motorized means is in electrical communication with an interior control switch.

14. The vehicle side rear-view mirror retrofit wiper assembly as set forth in claim 9 wherein a fluid pump and fluid reservoir are encased within the housing member and spaced from the motorized means.

15. The vehicle side rear-view mirror retrofit wiper assembly as set forth in claim 14, wherein the reservoir having a fill tube projecting therefrom and exiting the housing member about the upper side.

16. The vehicle side rear-view mirror retrofit wiper assembly as set forth in claim 14, wherein the pump having a fluid line in communication with at least one nozzle attached to the wiper arm.

17. A vehicle side rear-view mirror assembly having a retrofit wiper assembly mounted thereto, said side rear-view mirror assembly having a mirror and a mirror housing, the mirror housing comprising in combination:
  a first plate member and a second plate member with a body portion therebetween forming the mirror housing;
  said wiper assembly comprising;
    a wiper blade in communication with the mirror;
    a wiper arm being in communication with the wiper blade and having an arm control link positioned adjacent the first plate of the mirror housing;
    a motorized means positioned within a housing member, the housing member being encased within the mirror housing behind the mirror, the motorized means having a drive shaft coupled to a means for communicating with linking members coupled to a link pin, the linking members are in movable communication by way of a coupling, the link pin passing through the housing member to pass through the first plate of the mirror housing to lockingly couple with the arm control link of the wiper arm for allowing movable communication to extend from the linking members to the wiper arm for pendulum fashion movement of the wiper blade across the mirror of the one side rear-view mirror; and
    a biasing means positioned at the coupling point between the arm control link and the wiper arm to control the movement of the wiper arm and constantly urge the wiper blade against the surface of the mirror of the side rear-view mirror.

18. The vehicle side rear-view mirror retrofit wiper assembly as set forth in claim 17, wherein the motorized means is an electric motor with the drive shaft, the means for communicating with the linking members is a disk drive that engages the linking members, and the biasing means includes a spring arranged to urge the wiper arm towards the mirror.

19. The vehicle side rear-view mirror retrofit wiper assembly as set forth in claim 17, wherein a fluid pump and fluid reservoir being encased within the housing member and spaced from the motorized means.

20. The vehicle side rear-view mirror retrofit wiper assembly as set forth in claim 19, wherein the reservoir having a fill tube projecting therefrom and exiting the housing member and the first plate of the mirror housing, and the pump having a fluid line in communication with at least one nozzle attached to the wiper arm.

* * * * *